STRINGED MUSICAL INSTRUMENT

Original Filed Feb. 1, 1960 3 Sheets-Sheet 1

INVENTOR,
QUILLA H. FREEMAN;
BY
Galvin Brown,
ATTORNEY

STRINGED MUSICAL INSTRUMENT

Original Filed Feb. 1, 1960 3 Sheets-Sheet 2

INVENTOR,
QUILLA H. FREEMAN;
BY
Galvin Brown,
ATTORNEY

STRINGED MUSICAL INSTRUMENT

Original Filed Feb. 1, 1960 3 Sheets-Sheet 3

INVENTOR,
QUILLA H. FREEMAN,
BY
Calvin Brown,
ATTORNEY

United States Patent Office

Re. 25,728

Reissued Feb. 16, 1965

25,728

STRINGED MUSICAL INSTRUMENT

Quilla H. Freeman, Los Angeles, Calif., assignor to Fender Electric Instrument Co., Inc., Fullerton, Calif., a corporation of California Original No. 3,035,472, dated May 22, 1962, Ser. No. 5,863, Feb. 1, 1960. Application for reissue Mar. 13, 1964, Ser. No. 362,542

7 Claims. (Cl. 84—1.16)

Matter enclosed in heavy brackets [ ] appears in the original patent but forms no part of this reissue specification; matter printed in italics indicates the additions made by reissue.

The present invention relates to stringed musical instruments.

An object of the invention is to provide a stringed musical instrument capable of creating the harmonic structures of the sound spectrum, under the control of the instrumentalist.

A further object is the provision of a selector system which is easily manipulated by the instrumentalist of the musical instrument and by means of which overtones or harmonics and the amplification thereof may be readily selected and controlled during the playing of the musical instrument.

A further object is the provision of a stringed musical instrument which is so formed and constructed as to maintain the normal outward appearance of the instrument.

A further object of the invention is the provision of a stringed musical instrument so formed and constructed, that the player may select or reject any set of overtones and any given note.

A further object is the provision of a stringed musical instrument wherein fundamental tones may be dampened at the will of the player.

A further object is the provision of a stringed musical instrument incorporating means adapted to control the production of overtones or the damping thereof with relation to other overtones. With respect to this object, I am enabled to imitate various instruments such as a banjo, oboe, bassoon, celeste, trombone, saxophone, base viol, clarinet, as well as combinations of the aforesaid instruments.

The present invention contemplates a novel arrangement of electromagnets and wherein the magnetic flux extends upwardly a distance beyond the strings so that the normal position for strings in the instrument does not have to be changed or modified, and the strings at all times lie within the magnetic flux. The construction is such that the electromagnetic pick-ups may be housed within the body of the stringed musical instrument, the lines of magnetic flux being of sufficient length to at all times be cut by the strings.

A further object of my invention is to provide a novel form of electromagnetic pick-up utilizing a pair of magnets so arranged as to limit the amount of flux intermixing between the magnets to a relatively small amount.

Other objects and advantages of the present invention will suggest themselves to those skilled in the playing of stringed musical instruments, including simplicity of structure, ease of handling and playing of the instrument with all controls easily manipulated and with a minimum of effort by the player and which is generally superior to stringed musical instruments of the electric type now on the market.

With the above mentioned and other objects in view, the invention consists in the novel and useful provision, formation, construction, association and relative arrangement of parts, members and features, all as shown in certain embodiments in the accompanying drawings, described generally and more particularly pointed out in the claims.

Figure 1:
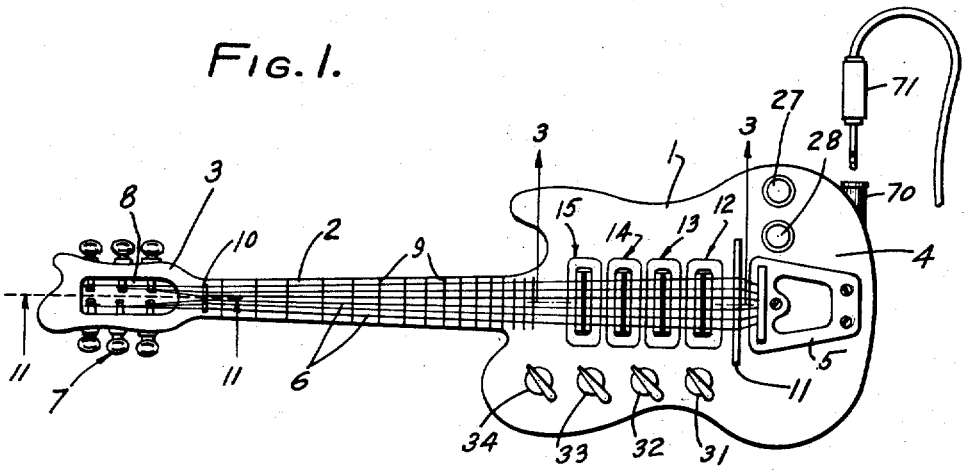
FIGURE 1 is a top plan view of a stringed musical instrument incorporating the invention.
Figure 2:
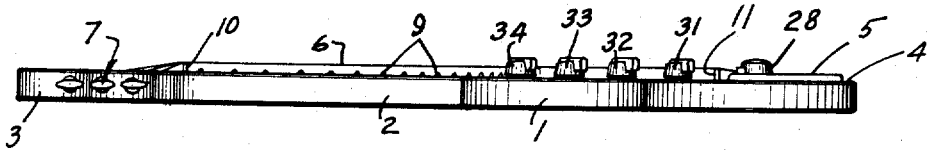
FIGURE 2 is a side elevation of the stringed musical instrument shown in FIGURE 1.
Figure 12:
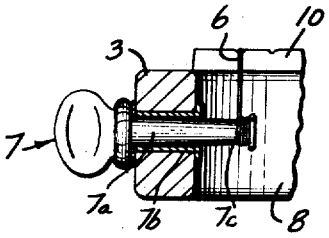
Figure 11:
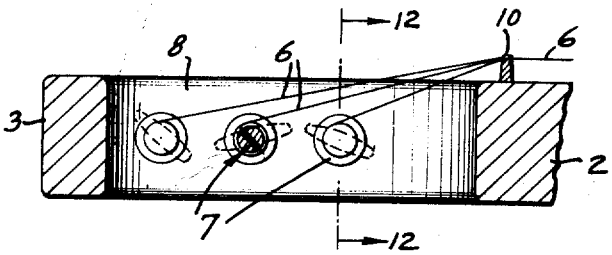

FIGURE 11 is a fragmentary, enlarged sectional view of the peg box or head of the musical instrument shown in FIGURES 1 and 2 and taken on the line 11—11 of FIGURE 1; and FIGURE 12 is a fragmentary sectional view on the line 12—12 of FIGURE 11.

Referring now to the drawings, I have shown in FIGURES 1 and 2 a stringed musical instrument of the lute type and in the present instance, a guitar. The guitar has a body 1, a neck 2, which terminates in a peg box or head 3, the body 1 is provided on its outer face member 4 with a tail piece 5 and with steel strings 6, of which there may be a plurality, six in the present instance, extending between the tail piece and adjustable pegs designated generally as 7, carried by the peg box 3. In the present instance, the peg box is longitudinally slotted at 8 and the pegs extend transversely of the peg box, the strings being secured to said pegs within the slot 8. This arrangement overcomes obstruction on the outer surface of the peg box. As is usual practice, the neck is provided with frets 9 over which the strings 6 are passed and the strings are supported above the frets by nut 10 and bridge 11. As shown in FIGURES 11 and 12, each peg includes a pin 7a passed through a bushing 7b in the peg box with a string wrapped around the pin and tensioned by turning the pin. This is ordinary practice, the present construction differing by the slotting of the peg box or head, as shown in FIGURES 1, 11 and 12.

Figure 3:
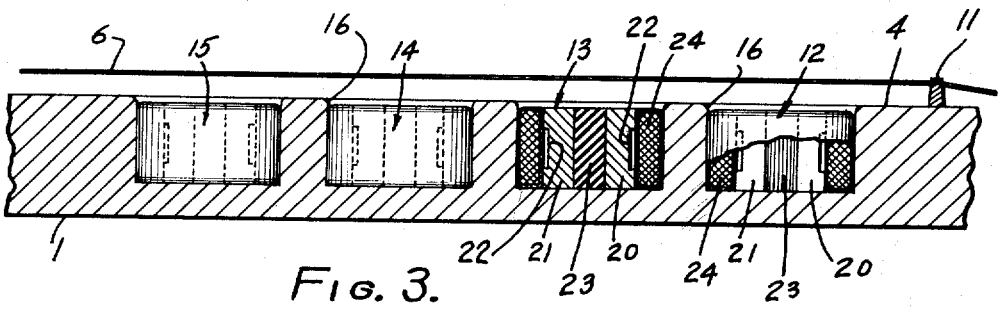
FIGURE 3 is a fragmentary sectional view, on an enlarged scale, taken on the line 3—3 of FIGURE 1.

In the present embodiment of my invention, I provide four electromagnetic pick-ups, as shown at 12, 13, 14 and 15 and said pick-ups are housed within the body 1 beneath the outer face member 4 and in such position as to allow the strings 6 to be positioned immediately above the pick-ups. This is accomplished in the manner shown in FIGURE 3 wherein the outer face member 4 is provided with transverse grooved portions 16 for each pick-up. The electromagnetic pick-ups may have tight engagement with the walls bounding each groove 16 or the pick-ups may be held within said grooves 16 in any approved manner. Thus, as revealed in both FIGURES 1 and 3, each electromagnetic pick-up is adjacent the outer surface of member 4. The body 1 may be hollow or it may be solid and have a thickness coresponding to the thickness of the neck, as illustrated in FIGURE 2. In some instances the body may be provided with a sound box, as is usual practice, although I have found that a construction such as shown in FIGURES 1 and 2 operates satisfactorily. The exact character of the body is not material. The electromagnetic pick-ups by being depressed below the outer face member 4 of the body do not interefere with the plucking of the strings 6.

Figure 4:
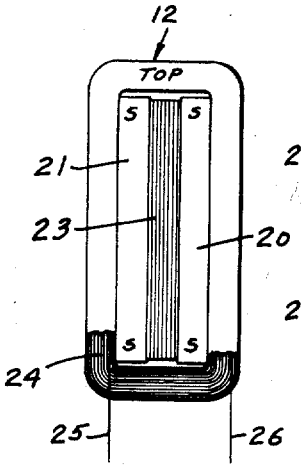
FIGURE 4 is a fragmentary, partially sectional plan view of one of the electromagnetic pick-ups and showing the polarity of one side of the pair of magnets.
Figure 5:
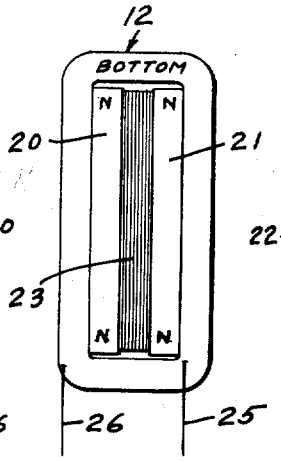
FIGURE 5 is a bottom plan view of the electromagnetic pick-up of FIGURE 4, and showing the polarity of the opposite side of said pair of magnets.
Figure 6:
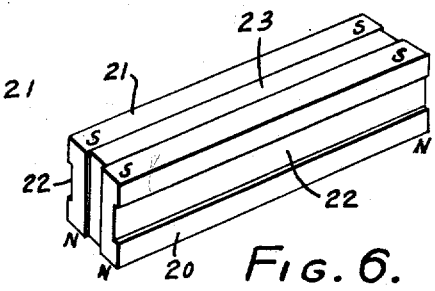
FIGURE 6 is a perspective view of a pair of magnets of a single pick-up.

As shown in FIGURES 4 to 6 inclusive, the electromagnetic pick-ups include elongated magnetic bars 20 and 21. Each magnetic bar is of identical construction and provided with a longitudinally extending groove 22 on one surface thereof. The other surface is plane and the plane surface of the two bars are separated by a non-magnetic bar 23. One longitudinal top or edge of each bar magnet is of one polarity and the opposite edge is of opposite polarity. Referring to FIGURE 6, the top edges of the magnetic bars 20 and 21, which are of the permanent magnet type, are South Polar while the opposite edges of the magnetic bars are North Polar. By this arrangement, the top and bottom edges of the two magnetic bars 20 and 21 have like polarities and tend to repel each other. The non-magnetic spacer bar 23 separates the magnetic bars so that the inter-mixing of magnetic flux between the bars is limited to a relatively small amount and the magnetic flux of each magnetic bar extends upwardly and outwardly from each bar and downwardly towards the opposite edge of each bar. Each pair of magnetic bars are surrounded by a coil of wire, as shown in FIGURE 4 at 24, there being a lead 25 from the inside of the coil of wire and a lead 26 from the outermost coil of wire. It is noted that the coil 24 lies within the magnetic flux of each bar magnet of the pair. Thus the magnetic flux by cutting the coil 24 generates an electric current of a certain frequency and this current is directed in a manner to be hereinafter described to volume and tone controls, see FIGURE 7 at 27 and 28 and thence to an amplifying system 29 and a loud speaker system 30. I have not detailed the construction of the volume and tone controls nor the character of the amplifier nor the loud speaker as these are ordinary on the market.

Positioned on the outer face member 4 of the body are a series of switch knobs 31, 32, 33 and 34. It will be noted that the switches are adjacent the electromagnetic pick-ups and in a position to be readily turned by the instrumentalist. The switch knobs, as stated, are on the exterior surface of the board 4 while the switch mechanism is housed within the body. Each switch is of identical construction and is of the double pole triple throw type having three switch arm positions. Switches of this character are available on the open market, and as illustrated diagrammatically in FIGURES 7 and 8, include two switch arms 40 and 41 which are moved simultaneously when the switch knobs are turned so that the switch arms engage contacts 50, 51, 52, 53, 54, and 55. Thus when the switch knob is rotated, switch arms 40 and 41 are always in alignment but may upon a turning of the switch knob, move from contacts 50 and 55 to other contacts such as 51, and 54; 52 and 53. When the switch arms 40 and 41 are in engagement with contacts 50 and 55, the electromagnetic pick-up is not being utilized and hence this gives the starting position for each switch knob. For instance, as shown in FIGURE 1, the switch knobs are so positioned that the contact arms 40 and 41 are in engagement with contacts 50 and 55. The inside lead 25 for each coil is secured to contact points 53 and 51. Contact point 54 through lead 42 connects with contact point 52 and the outer coil lead 26, while the opposite contact point 53 through lead 43 connects with contact 51.

The switching arrangement for each electromagnetic pick-up is such that three positions are shown for each pick-up. In one position of the switch the electromagnetic pick-up is in circuit. In a second position the flow of current through the coil 24 is in one direction while in a third position of the switch the current is directed in an opposite direction through the coil. Thus in utilizing the four electromagnetic pick-ups, the switches may be turned to different positions while in one position of a switch with relation to a pick-up, the current will flow in one direction whereas in an adjacent pick-up the switch may be turned so as to get direct current through its coil in an opposite direction with resulting damping effect on the tone produced by a vibrating string. If the pick-ups are turned so as to direct the current in the same direction between two pick-ups, a different tone will be produced and hence the vibrations of a single string will be controlled to produce different sounds. It is realized that the current induced in the coils surrounding the magnets may not be uni-directional and if so the switching arrangement as described above can be used to alter the phase relationship to produce the results described.

The operation, uses and advantages of my invention are as follows.

Figure 9:
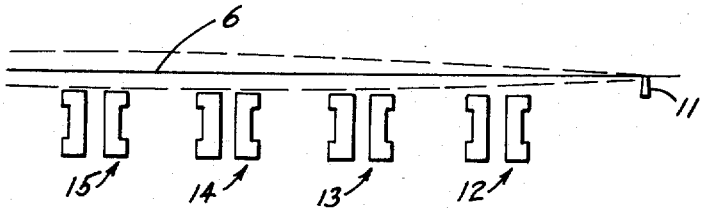
FIGURE 9 is a diagrammatic view of the electromagnetic pick-ups with a string vibrating thereabove.
Figure 10:
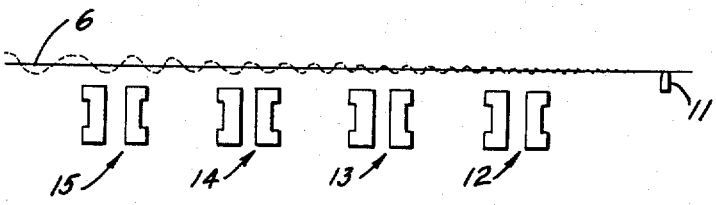
FIGURE 10 is similar to FIGURE 9, but showing a sine wave resultant upon plucking a string.

I have found that permanent magnets of the Alnico type perform satisfactorily for my purpose. Magnets under the name Alnico are supplied by the General Electric Company and comprise an alloy of aluminum-nickel-cobalt and iron. As shown in FIGURE 6, the bar magnets are bipolar, the poles being enlarged. The electromagnetic pick-ups lie in one plane in parallel equal spaced relationship and are positioned relative to the string length, bridge 11 and the frets as shown in FIGURE 1, so as to accommodate the four pick-ups. The effect relative to a string 6 is illustrated in FIGURES 9 and 10 wherein the maximum amplitude of string vibration is indicated in dotted lines.

Figure 7:
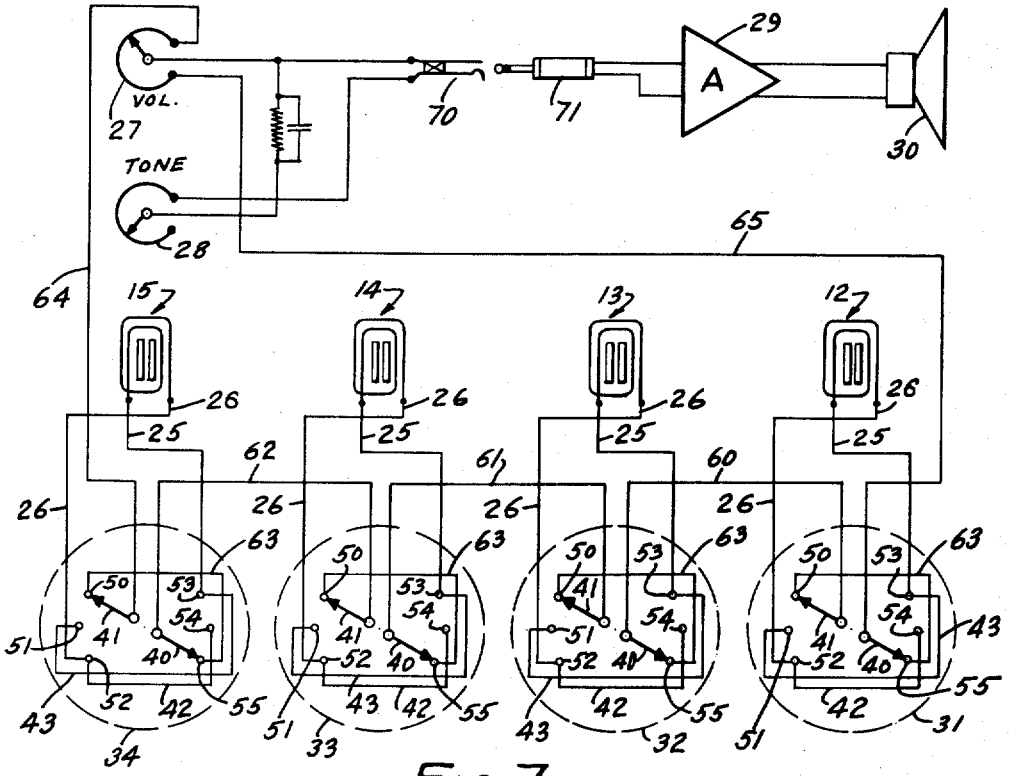
FIGURE 7 is a diagrammatic view of the electromagnetic pick-ups and switches for controlling current flow through said pick-ups together with a sound system.
Figure 8:
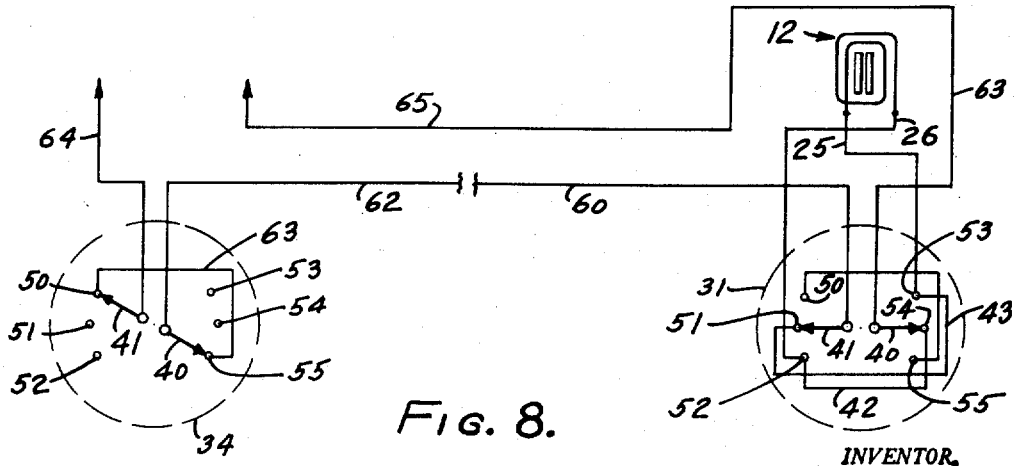
FIGURE 8 is a diagrammatic view showing certain switches in different positions.

Referring to FIGURE 7, I have numbered the electromagnetic pick-ups from the bridge 11, as 12, 13, 14 and 15. These pick-ups also include the individual switches and for convenience I will designate the pick-ups and their switches by their locations as 12 to 15 inclusive. It will be observed that switch arm 41 of the pick-up at 12 is connected by lead 60 to switch arm 40 of pick-up 13, and this arrangement is followed for the remaining pick-ups 13, 14 and 15, as indicated by the leads 61 and 62, switch arm 41 being connected to switch arm 40 in the several instances. As shown by the circuits for each pick-up, contact points 50 and 55 are connected by a lead 63 for each switch. If the circuits are traced, it will be found that when the switch arms are in the position shown in FIGURE 7 the electromagnetic pick-ups are out of circuit with leads 64 and 65 connecting the volume and tone controls and through said controls to the amplifier and loud speaker systems. If we consider the circuit shown in FIGURE 8 and leave the switch arms in the position shown in FIGURE 7 for the electromagnetic pick-ups at 13, 14 and 15, and turn the switch arms 40 and 41 to the position shown in FIGURE 8 for pick-up 12, the switch arms will engage contacts 51 and 54. Thus the pick-up at 12 is now in circuit with the volume and tone controls 27 and 28. The outside coil lead 26 is in circuit with contact 54 and through the switch arm 40 with lead 65. The inside coil lead 25 connects with contact 51 and through the switch arm 41 with lead 64. Theoretically, at least, the flow of current is from the inside winding of the coil to the outside winding thereof, or vice versa. If we assume that the switch arms 40 and 41 of the second electromagnetic pick-up at 13 are in engagement with contacts 52, 53, then following the same notation as before, the current flow through the coil will be from the outside coil to the lead for the inside coil and the currents directed through the pick-up coils at their respective stations 12 and 13 would be in opposite directions and therefore would mute the overtones as well as the fundamental notes of the vibrating string 6. Actual practice has shown that this is exactly what happens during the playing of the instrument. Hence, by varying the direction of current flow through the pick-up coils, I am enabled to have a full selection of overtones to produce sounds of different instruments. By way of further example, I may produce the tone of the oboe by turning the switch for the electromagnetic pick-up at 12 to the position where the switch arms 40 and 41 make contact with contacts 52 and 53. When the current from one pick-up mixes with a second pick-up, the second pick-up has a damping effect. When two pick-ups have their switches so turned as to be in the position shown in FIGURE 7; i.e., the arms 40 and 41 in contact with contacts 50 and 55, both of the pick-ups are out of the circuit. When the pick-up controlled by the switch for pick-up 12 is moved to the position shown in FIGURE 8, this pick-up is, of course, in circuit. Upon turning the knob 32 for the pick-up at 13, so that the switch arms 40 and 41 lie in the position which makes contact with contacts 51 and 54, the pick-up at 13 is in circuit and upon turning the switch arms for pick-up 12 so that the arms extend between contacts 52 and 53, the direction of flow of electricity is reversed. The only time that there is a damping effect is when the harmonic or portions of harmonics are the same when picked up by two or more of the electromagnetic pick-ups. If one string 6 is plucked and there are two pick-ups, certain of the harmonics will be damped and others will be passed to the volume and tone controls. All harmonics are in the middle register and are audible to the human ear. With this instrument, I may select harmonics or portions thereof to create different sounds by a combination of sounds. If all of the switch arms are turned so that the arms 40 and 41 lie between contacts 51 and 54, there is an over abundance of overtones and a very rich sound. The same is true if all of the arms lie between contacts 52 and 53. It will be seen that the entire purpose of the switching arrangement is to select or reject any one or all of the four electromagnetic pick-ups at any given time and to reverse the flow or current of any one or all pick-ups at any given time.

Other features of my invention which should be noted is the arrangement of the peg box or head. The slot 8 receives ends of the pegs and thus renders the securing of the strings 6 to the pegs an easy matter for the instrumentalist as the string ends may be passed through openings 7c in the pegs and the pegs turned to tension the strings. In case of string breakage, the string is easily replaced and in a simpler and more efficient manner than where the pegs must turn upstanding pegs on the peg box, as is normal practice.

FIGURE 1 likewise shows a simple method wherein, without detracting from the appearance of the instrument, leads from the volume and tone control may be secured to the amplifier and speaker systems. Thus leads from the volume and tone control connect with a socket 70 on the side of the instrument which receives a plug 71 and through suitable connections connects to the amplifier. In no case have I shown any source of electrical current, but the use of such a current is, of course, intended for the amplifier and loud speaker system and a current of the direct type may be supplied to the coils of the various pick-ups, although in actual practice I have not found such a requirement necessary. However, I do not exclude this possibility.

By dividing the switching circuit and using separate output leads consisting of two grounds and two positive leads which are connected to two separate amplifiers and speakers, a very novel stereophonic effect can be obtained which also imitates different instruments.

I claim:

*1.* A musical instrument including: a plurality of spaced apart steel strings, a plurality of pick-up means mounted in spaced apart, parallel relationship in said instrument beneath the strings, each pick-up means comprising a pair of spaced apart bar magnets which extend transversely of the plurality of steel strings, the top edge of each magnet having the same polarity as the top edge of each of the other magnets and the bottom edge of each magnet having the same polarity as the bottom edge of each of the other magnets, to limit the amount of flux intermixing between the magnets to a relatively small amount, with the flux density of each magnet cutting the steel strings, a wire coil surrounding each pair of magnets of each pick-up means and means for each pick-up means for placing the pick-up coil in circuit, out of circuit, altering or maintaining the phase relationship with one or all of the remaining pick-up coils.

*2. An electric guitar, which comprises*

*a body having an outer face,*

*a neck connected to said body and extending outwardly therefrom,*

*a plurality of guitar strings mounted over said face and said neck in substantially parallel, tensioned relationship,*

*said strings being stretched over a bridge which is disposed on said body in spaced relationship from said neck,*

*said strings being formed of magnetizable material, said strings being disposed generally in a single plane which is generally parallel to said face,*

*first permanent-magnet means mounted on said body beneath at least said one of said strings,*

*said first permanent-magnet means being so disposed that one magnetic pole means thereof is relatively adjacent said plane of said strings and the opposite magnetic pole means thereof is remote from said plane of said strings,*

*said one magnetic pole means of said first permanent-magnet means being disposed sufficiently far from said plane of said strings to prevent interference with plucking of said strings,*

*second permanent-magnet means mounted on said body beneath at least said one of said strings,*

*said second permanent-magnet means being so disposed that one magnetic pole means thereof is relatively adjacent said plane of said strings and the opposite magnetic pole means thereof is remote from said plane of said strings,*

*said one magnetic pole means of said second permanent-magnet means being of the same magnetic polarity as said one magnetic pole means of said first permanent-magnet means,*

*said one magnetic pole means of said second permanent-magnet means being disposed sufficiently far from said plane of said strings to prevent interference with plucking of said strings,*

*said one magnetic pole means of said first permanent-magnet means and said one magnetic pole means of said second permanent-magnet means being disposed sufficiently close to each other that said one magnetic pole means thereof of the same magnetic polarity repel each other in substantial degree,*

*said one magnetic pole means of said first permanent-magnet means and said one magnetic pole means of said second permanent-magnet means being spaced from each other,*

*the spacing between said one magnetic pole means being sufficient to effect upward projection to the plane of said strings of the magnetic flux present at said one magnetic pole means, whereby vibration of said strings will affect said magnetic flux in substantial degree, and*

*electrical coil means provided around said first permanent-magnet means and said second permanent-magnet means to generate a voltage in response to said vibration of said strings,*

*said coil means being disposed sufficiently far from said plane of said strings to prevent interference with plucking of said strings,*

*said coil means being a single coil of wire encompassing said first and second permanent-magnet means.*

*3. The invention as claimed in claim 2, in which said one magnetic pole means of said first permanent-magnet means and of said second permanent-magnet means extend transversely of said strings beneath a plurality of said strings, said one magnetic pole means of said first permanent-magnet means being substantially parallel to said one magnetic pole means of said second permanent-magnet means.*

*4. The invention as claimed in claim 2, in which said coil means and said first and second permanent-magnet means are recessed into said body, the amount of said recessing being sufficient that all parts of said permanent-magnet means and said coil means are substantially no closer to said plane of said strings than is said face.*

*5. An electric guitar, which comprises:*

*a body having an outer face,*

*a fretted neck connected to said body and extending outwardly therefrom,*

*a plurality of guitar strings mounted over said face and said neck in substantially parallel, tensioned relationship,*

*said strings being stretched over a bridge which is disposed on said body in spaced relationship from the base of said neck,*

*said strings being formed of magnetizable material,*

*said strings being disposed generally in a single plane which is generally parallel to said face,*

*a plurality of electromagnetic pickup means mounted on said body beneath said strings and between said bridge and said base of said neck,*

*each of said pickup means including permanent-magnet means magnetically associated with said strings,*

*each of said pickup means also including coil means wound around said permanent-magnet means whereby vibration of said strings induces a voltage in said coil means,*

*said pickup means being disposed at spaced points longitudinally of said strings whereby to sense various overtones in different degrees, and*

*electric circuit means to connect said coil means of said pickup means to each other and to an output means which is adapted to be connected to amplifier and loudspeaker means,*

*said electric circuit means including a plurality of switches electrically connected, respectively, to said coil means of said pickup means,*

*each of said switches having a first position at which the associated coil means is connected in said electric circuit means in a predetermined phase relationship,*

*each of said switches also having a second position at which the associated coil means is connected in said electric circuit means in a phase relationship which is the reverse of said predetermined phase relationship,*

*each of said switches also having a third position at which the associated coil means is inoperative to affect the signal transmitted to said output and thus to said amplifier and loudspeaker means,*

*whereby the guitarist may readily and rapidly connect each of said coil means into or out of said electric circuit means and in either forward or reverse phase relationship.*

*6. An electric guitar, which comprises:*

*a body having an outer face,*

*a fretted neck connected to said body and extending outwardly therefrom,*

*a plurality of guitar strings mounted over said face and said neck in substantially parallel, tensioned relationship,*

*said strings being stretched over a bridge which is disposed on said body in spaced relationship from the base of said neck,*

*said strings being formed of magnetizable material,*

*said strings being disposed generally in a single plane which is generally parallel to said face,*

*first electromagnetic pickup means mounted on said body beneath said strings and between said bridge and said base of said neck,*

*said first pickup means being disposed relatively adjacent said bridge,*

*said first pickup means including first permanent-magnet means magnetically associated with said strings and also including first coil means wound around said first permanent-magnetic means whereby vibration of said strings induces a voltage in said first coil means,*

*first switch means mounted on said body and electrically connected with said first coil means,*

*said first switch means having a first setting at which said first coil means is connected thereto in a predetermined phase relationship, a second setting at which said first coil means is connected thereto in a phase relationship which is the reverse of said predetermined phase relationship, and a third setting at which said first coil means is inoperative,*

*second electromagnetic pickup means mounted on said body beneath said strings and between said first pickup means and said base of said neck,*

*said second pickup means being spaced from said first pickup means,*

*said second pickup means including second permanent-magnet means magnetically associated with said strings and also including second coil means wound around said second permanent-magnet means whereby vibration of said strings induces a voltage in said second coil means,*

*second switch means mounted on said body and electrically connected with said second coil means,*

*said second switch means having a first setting at which said second coil means is connected thereto in a predetermined phase relationship, a second setting at which said second coil means is connected thereto in a phase relationship which which is the reverse of said predetermined phase relationship, and a third setting at which said second coil means is inoperative,*

*third electromagnetic pickup means mounted on said body beneath said strings and between said second pickup means and said base of said neck,*

*said third pickup means being spaced from said second pickup means,*

*said third pickup means including third permanent-magnet means magnetically associated with said strings and also including third coil means wound around said third permanent-magnet means whereby vibration of said strings induces a voltage in said third coil means,*

*third switch means mounted on said body and electrically connected with said third coil means,*

*said third switch means having a first setting at which said third coil means is connected thereto in a predetermined phase relationship, a second setting at which said third coil means is connected thereto in a phase relationship which is the reverse of said predetermined phase relationship, and a third setting at which said third coil means is inoperative, and*

*electric circuit means to connect said first switch means, said second switch means, and said third switch means*

*to output means which is adapted to be connected to amplifier and loudspeaker means,*

*whereby by shifting said various switch means each of said coil means may be connected into said circuit means in a predetermined phase relationship or in a phase relationship which is the reverse of said predetermined phase relationship, or may be rendered inoperative to affect the signal delivered through said output means to said amplifier and loudspeaker means.*

*7. An electric guitar, which comprises:*

*an elongated rigid support means for a plurality of guitar strings,*

*a plurality of guitar strings mounted longitudinally over said rigid support means in substantially parallel, tensioned relationship,*

*said strings being extended over first and second bridges which are disposed on said support means adjacent opposite end portions thereof,*

*said strings being formed of magnetizable material and lying generally in a single plane,*

*a plurality of electromagnetic pickup means mounted on said support means beneath said strings and relatively adjacent said first bridge,*

*each of said pickup means including permanent-magnet means magnetically associated with said strings,*

*each of said pickup means also including coil means wound around said permanent-magnet means whereby vibration of said strings induces a voltage in said coil means,*

*said pickup means being disposed at different points longitudinally of said strings whereby to sense various overtones in different degrees, and*

*electrically circuit means to connect said coil means of said pickup means to each other and to an output means which is adapted to be connected to amplifier and loudspeaker means,*

*said electric circuit means including switch means to selectively connect said coil means of each of said pickup means in said electric circuit means in a predetermined phase relationship, in said electric circuit means in a phase relationship which is the reverse of said predetermined phase relationship, and out of said electric circuit means to render such coil means inoperative.*

References Cited by the Examiner

The following references, cited by the Examiner, are of record in the patented file of this patent or the original patent.

UNITED STATES PATENTS

| | | | |
|---|---|---|---|
| 1,906,607 | 5/33 | Jacobs | 84—1.20 X |
| 2,089,171 | 8/37 | Beauchamp | 84—1.15 |
| 2,817,261 | 12/57 | Fender | 84—1.16 |
| 2,897,709 | 8/59 | McCarty et al. | 84—1.15 |
| 2,958,249 | 11/60 | Machalek et al. | 84—1.16 |

FOREIGN PATENTS

| | | |
|---|---|---|
| 113,270 | 6/41 | Australia. |
| 660,741 | 11/51 | Great Britain. |
| 876,500 | 5/53 | Germany. |

OTHER REFERENCES

Bouie: "Servicing Electric Guitars," Radio and Television News, March 1955 (pages 63–65) (pages 64 and 65 relied on).

ARTHUR GAUSS, *Primary Examiner.*